United States Patent
Chen et al.

(10) Patent No.: US 12,112,533 B2
(45) Date of Patent: Oct. 8, 2024

(54) METHOD AND APPARATUS FOR DATA CALCULATION IN NEURAL NETWORK MODEL, AND IMAGE PROCESSING METHOD AND APPARATUS

(71) Applicant: TENCENT TECHNOLOGY (SHENZHEN) COMPANY LIMITED, Guangdong (CN)

(72) Inventors: Hongrui Chen, Shenzhen (CN); Wenran Liu, Shenzhen (CN); Qifeng Chen, Shenzhen (CN); Haoyuan Li, Shenzhen (CN); Feng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 425 days.

(21) Appl. No.: 17/499,497

(22) Filed: Oct. 12, 2021

(65) Prior Publication Data
US 2022/0036106 A1 Feb. 3, 2022

Related U.S. Application Data

(63) Continuation of application No. PCT/CN2020/098762, filed on Jun. 29, 2020.

(30) Foreign Application Priority Data

Dec. 16, 2019 (CN) .......................... 201911294742.9

(51) Int. Cl.
*G06V 10/94* (2022.01)
*G06F 18/21* (2023.01)
*G06N 3/08* (2023.01)
*G06T 1/20* (2006.01)

(52) U.S. Cl.
CPC ............ *G06V 10/955* (2022.01); *G06F 18/21* (2023.01); *G06N 3/08* (2013.01); *G06T 1/20* (2013.01)

(58) Field of Classification Search
CPC .... G06V 10/955; G06V 10/82; G06V 40/107; G06V 40/161; G06F 18/21; G06N 3/08;
(Continued)

(56) References Cited

U.S. PATENT DOCUMENTS 9,367,892 B2 * 6/2016 Wu .................. G06V 10/50
2016/0342888 A1 * 11/2016 Yang .................. G06V 10/454
(Continued)

FOREIGN PATENT DOCUMENTS

CN 105574585 A * 5/2016
CN 108694694 A 10/2018
(Continued)

OTHER PUBLICATIONS

Chen et al., "Optimizing Memory Efficiency for Convolution Kernels on Kepler GPUs," Association for Computing Machinery, 2017, doi: 10.1145/3061639.3062297. (Year: 2017).*
(Continued)

*Primary Examiner* — Emily C Terrell
*Assistant Examiner* — Julia Z. Yao
(74) *Attorney, Agent, or Firm* — Sughrue Mion, PLLC (57) ABSTRACT

A method and an apparatus for data calculation in a neural network model, and an image processing method and apparatus. The method for data calculation includes: reading weight data shared by a group of data processing of a data processing layer in a neural network model, into a GroupShared variable of a thread group of a graphics processing unit (GPU), dividing input data of the data processing layer based on the number of threads in the thread group, reading, for each group of input data, weight data corresponding to
(Continued)

the group of input data for a data processing in the group of data processing from the GroupShared variable, and performing, by each thread in the thread group, the data processing by using a group of read input data and weight data corresponding to the group of input data, to obtain a calculation result corresponding to the group of input data.

17 Claims, 5 Drawing Sheets

(58) Field of Classification Search
CPC .......... G06N 3/045; G06N 3/063; G06T 1/20; Y02D 10/00
See application file for complete search history.

(56) References Cited

U.S. PATENT DOCUMENTS

| | | | |
|---|---|---|---|
| 2018/0046900 A1* | 2/2018 | Dally | .................... G06F 9/3001 |
| 2019/0197420 A1 | 6/2019 | Singh et al. | |
| 2021/0142179 A1* | 5/2021 | Chen | ....................... G06N 3/084 |

FOREIGN PATENT DOCUMENTS

| | | | |
|---|---|---|---|
| CN | 109460785 A | | 3/2019 |
| CN | 109885407 A | * | 6/2019 |
| CN | 111062473 A | | 4/2020 |

OTHER PUBLICATIONS

Strigl et al., "Performance and Scalability of GPU-Based Convolutional Neural Networks," 2010 18th Euromicro Conference on Parallel, Distributed and Network-based Processing, Pisa, Italy, 2010, pp. 317-324, doi: 10.1109/PDP.2010.43. (Year: 2010).*
Georganas et al., "Anatomy of High-Performance Deep Learning Convolutions on SIMD Architectures," SC18: International Conference for High Performance Computing, Networking, Storage and Analysis, Dallas, TX, USA, 2018, pp. 830-841, doi: 10.1109 /SC.2018.00069. (Year: 2018).*
Li et al., "Fast Convolution Operations on Many-Core Architectures," 2015 IEEE 17th International Conference (IC) on High Performance Computing and Communications, IEEE 7th International Symposium on Cyberspace Safety and Security, and IEEE12th IC on Embedded Software and Systems, pp. 316-323 (Year: 2015).*
Podlozhnyuk, "Image Convolution with CUDA," NVIDIA Corporation, Jun. 2007., pp. 1-21. (Year: 2007).*
Zhong, "Accelerations of Structural and Functional Brain Connectivity Using Heterogeneous Computing," Nov. 2016, Clayton School of Information Technology Monash University, Doctor of Philosophy Thesis. (Year: 2016).*
Ni, Tianyun, "Direct Compute—Bring GPU Computing to the Mainstream," Oct. 1, 2009, Nvidia Corporation, GPU Technology Conference, San Jose, CA. (Year: 2009).*
Yang et al., "HppCnn: A High-Performance, Portable Deep-Learning Library for GPGPUs," 2016 45th International Conference on Parallel Processing (ICPP), Philadelphia, PA, USA, 2016, pp. 582-587, doi: 10.1109/ICPP.2016.73. (Year: 2016).*
Qin et al., "Diagonalwise Refactorization: An Efficient Training Method for Depthwise Convolutions," 2018 International Joint Conference on Neural Networks (IJCNN), Rio de Janeiro, Brazil, 2018, pp. 1-8, doi: 10.1109/IJCNN.2018.8489312. (Year: 2018).*
International Search Report for PCT/CN2020/098762 dated Oct. 9, 2020 [PCT/ISA/210].
Written Opinion for PCT/CN2020/098762 dated Oct. 9, 2020 [PCT/ISA/237].

* cited by examiner

METHOD AND APPARATUS FOR DATA CALCULATION IN NEURAL NETWORK MODEL, AND IMAGE PROCESSING METHOD AND APPARATUS

CROSS REFERENCE TO RELATED APPLICATION(S)

This application is a continuation application of International Application No. PCT/CN2020/098762 filed on Jun. 29, 2020, which claims priority to Chinese Patent Application No. 201911294742.9 filed with the China National Intellectual Property Administration on Dec. 16, 2019, the disclosures of which are incorporated by reference in their entireties.

FIELD

The disclosure relates to the field of computer technologies, and in particular, to a method and an apparatus for data calculation in a neural network model, and an image processing method and apparatus.

BACKGROUND

Generally, data in a neural network model may be calculated by a graphics processing unit (GPU). One calculation unit in the GPU calculates a value of one output data point at a time. For an output data point being currently calculated, the calculation unit reads input data and corresponding weight data that are required for calculating the output data point, from a GPU memory for calculation, to obtain a value of the output data point.

SUMMARY

An objective of the disclosure is to resolve at least one of the foregoing technical defects. The solutions in the disclosure can reduce the number of times of reading weight data, thereby improving calculation efficiency.

An embodiment of the disclosure may provide a method for data calculation in a neural network model. The method is applied to data calculation of at least one data processing layer in a neural network model, the data calculation being performed by a thread group of a graphics processing unit (GPU), and the method includes:
  reading weight data of a data processing layer required by a thread group for data calculation into a GroupShared variable of the thread group;
  dividing input data of the data processing layer based on the number of threads in the thread group;
  reading, for each group of input data after division, weight data corresponding to the group of input data for a data processing from the GroupShared variable; and
  performing, by the threads in the thread group, data calculation based on each group of input data and weight data corresponding to the group of input data for a data processing, to obtain a calculation result corresponding to the group of input data.

An embodiment of the disclosure further provides an image processing method, including:
  obtaining a target image; and
  processing the target image through a neural network model, to obtain a corresponding image processing result,
  the neural network model including a data processing layer, and at least one data processing layer of the neural network model using the method for data calculation in a neural network model according to the first aspect or any embodiment of the first aspect to perform corresponding data processing.

An embodiment of the disclosure may provide an apparatus for data calculation in a neural network model. The apparatus is applied to data calculation of at least one data processing layer in a neural network model, the data calculation being performed by a thread group of a graphics processing unit (GPU), and the apparatus includes:
  a first weight data reading module, configured to read weight data of a data processing layer required by a thread group for data calculation into a GroupShared variable of the thread group;
  a data division module, configured to divide input data of the data processing layer based on the number of threads in the thread group;
  a second weight data reading module, configured to read, for each group of input data after division, weight data corresponding to the group of input data for a data processing from the GroupShared variable; and
  a data calculation module, configured to enable the threads in the thread group to perform data calculation based on each group of input data and weight data corresponding to the group of input data for a data processing to obtain a calculation result corresponding to the group of input data.

An embodiment of the disclosure may provide an image processing apparatus, including:
  an image obtaining module, configured to obtain a target image; and
  an image processing module, configured to process the target image through a neural network model, to obtain a corresponding image processing result,
  the neural network model including a data processing layer, and at least one data processing layer of the neural network model using the method for data calculation in a neural network model according to the first aspect or any optional implementation of the first aspect to perform corresponding data processing.

An embodiment of the disclosure may provide an electronic device, including:
  a processor and a memory,
  the memory being configured to store computer operation instructions, and
  the processor being configured to invoke the computer operation instructions, to perform the method according to any one embodiment of the first aspect or the second aspect of the disclosure.

An embodiment of the disclosure may provide a computer-readable storage medium, storing at least one computer program, the at least one computer program being loaded and executed by a processor to implement the method according to any one embodiment of the first aspect or the second aspect of the disclosure.

In the embodiments of the disclosure, weight data of a data processing layer required by a thread group for data calculation can be read into a GroupShared variable of the thread group, and input data of the data processing layer can be divided based on the number of threads in the thread group. For threads in the same thread group, each thread needs the same weight data during a data processing. Therefore, for each group of input data after division, weight data corresponding to the group of input data for a data processing can be read from the GroupShared variable. Therefore, for input data corresponding to the same thread group, there is no need to read corresponding weight data once for each piece of input data, which can reduce the number of times of reading weight data. Therefore, when the threads in the thread group perform data calculation based on each group of input data and weight data corresponding to the group of input data for a data processing, to obtain a calculation result corresponding to the group of input data, calculation efficiency can be improved.

BRIEF DESCRIPTION OF THE DRAWINGS

To describe the technical solutions of example embodiments of the disclosure more clearly, the following briefly describes the accompanying drawings required for describing the example embodiments of the disclosure. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Embodiments of the disclosure are described in detail below, and examples of the embodiments are shown in accompanying drawings, where the same or similar elements or the elements having same or similar functions are denoted by the same or similar reference numerals throughout the description. The embodiments described below with reference to the drawings are exemplary, which are only used for explaining this application, and cannot be constructed as a limitation to this application.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to the another element, or an intermediate element may exist. In addition, the "connection" or "coupling" used herein may include a wireless connection or a wireless coupling. The term "and/or" used herein includes all of or any of units and all combinations of one or more related listed items.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Machine learning (ML) is a multi-field interdisciplinary subject involving the probability theory, statistics, the approximation theory, convex analysis, the algorithm complexity theory, and the like. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and adversarial learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the example embodiments of the disclosure involve technologies such as ML of AI.

To better understand and describe the solutions in the embodiments of the disclosure, the following briefly describes some technical terms involved in the embodiments of the disclosure.

Neural network (NN): an algorithmic mathematical model for distributed parallel information processing by imitating behavioral characteristics of an animal neural network. The network implements processing of information by adjusting an interconnection among a large quantity of internal nodes based on the complexity of a system.

Convolution: a convolution operator defined in convolutional architecture for fast feature embedding (Caffe), which is generally translated as "卷积" in Chinese.

Shader: a programmable graphics pipeline; and a program running exclusively on a GPU, which is translated as "着色器" in Chinese.

GroupShared: a shared cache variable in a GPU thread group.

Open Graphics Library (OpenGL): a cross-language and cross-platform application programming interface for rendering 2D and 3D vector graphics.

Direct 3D: a 3D graphics interface based on a common object mode (COM) of the Microsoft.

Metal: a low-level rendering application programming interface providing the lowest level required by software to ensure that the software can run on different graphics chips.

Data calculation in a neural network model is usually operated by a Shader in a cross-platform GPU implementation process. A convolution layer is a relatively important part of a data processing layer of the neural network, and most of the calculations of the neural network related to vision are usually completed in the convolution layer. As a Shader performs the calculation of each layer of the neural network, in order to improve the parallelism, a thread is usually used to calculate a value of an output point, and the calculation of the convolution layer is also the same. For example, if the input data has a width w, a height h, a depth c, a width Kw and a height Kh of a convolution kernel, and a convolution group 1, in order to calculate the value of the first output point, for the first thread of the GPU, the input data needs to be read as Kw*Kh*c data with a width of 0 to Kw, a height of 0 to Kh, and a depth of c, and Kw*Kh*c pieces of weight data of the first channel corresponding to the convolution kernel also need to be read. In this case, output data at the first point is a value obtained by multiplying the weight data corresponding to the convolution kernel by the input data, and adding a convolution bias (which is also referred to as a convolution offset or bias data). Output data at the remaining points is calculated in a similar way to the output data at the first point.

Figure 1:
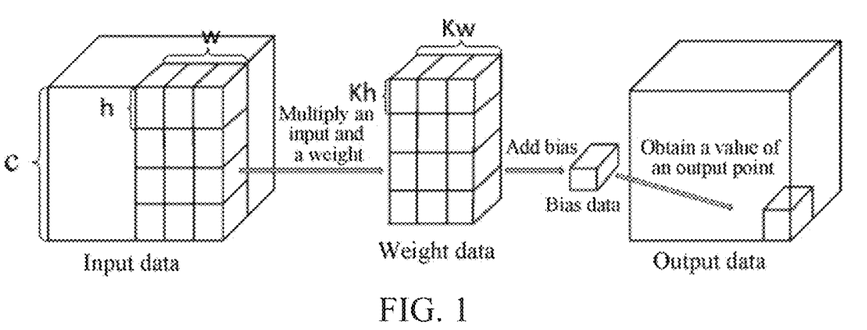
FIG. 1 is a schematic diagram of a calculation process of calculating output data based on a GPU according to an example embodiment of the disclosure.

For details, reference may be made to a calculation process of calculating output data based on a GPU shown in FIG. 1. In FIG. 1, the input data at the first point is Kw*Kh*c pieces of data with a width of 0 to Kw, a height of 0 to Kh, and a depth of c. As shown in FIG. 1, Kw is 3, Kh is 1, and c is 4; and the weight data is Kw*Kh*c pieces of data. Based on the input data, weight data (weight data shown in FIG. 1) and bias data, a value of a point, that is, a value of a corresponding point in the output data, can be calculated.

Kw*Kh*c pieces of weight data need to be read during calculating the output data of a point. For the same output plane, that is, a plane corresponding to multiple points in the same dimension (any one of width, height, and depth), each thread needs to read the required weight data once. For example, if the depth c of the input data is 64, the size of the convolution kernel is 3*3, and the convolution group is 1, during calculation in a thread group with dimensions of 6*6*8 each thread needs to read 3*3*64 pieces of weight data once, and 6*6*8 pieces of weight data need to be read in total. In the calculation process, a lot of time is consumed for obtaining the weight data based on the foregoing manner of reading weight data, resulting in low calculation efficiency.

In view of the problem existing in the related art, and to better meet actual application requirements, an embodiment of the disclosure provides a method for data calculation in a neural network model. Weight data of a data processing layer required by a thread group for data calculation is read into a GroupShared variable of the thread group. Input data of the data processing layer is divided based on the number of threads in the thread group. For threads in the same thread group, the same weight data may be shared. Then, for each group of input data after division, weight data corresponding to the group of input data for a data processing may be read from the GroupShared variable. Therefore, for input data corresponding to the same thread group, there is no need to read corresponding weight data for each piece of input data, which can reduce the number of times of reading weight data. Therefore, the threads in the thread group perform data calculation based on each group of input data and weight data corresponding to the group of input data for a data processing, store a calculation result corresponding to the each group of input data for a data processing into the GroupShared variable, and accumulate calculation results corresponding to all the groups of input data to obtain a calculation result of a point. The solution fully increases the parallelism of calculation, thereby improving calculation efficiency.

Figure 2A:
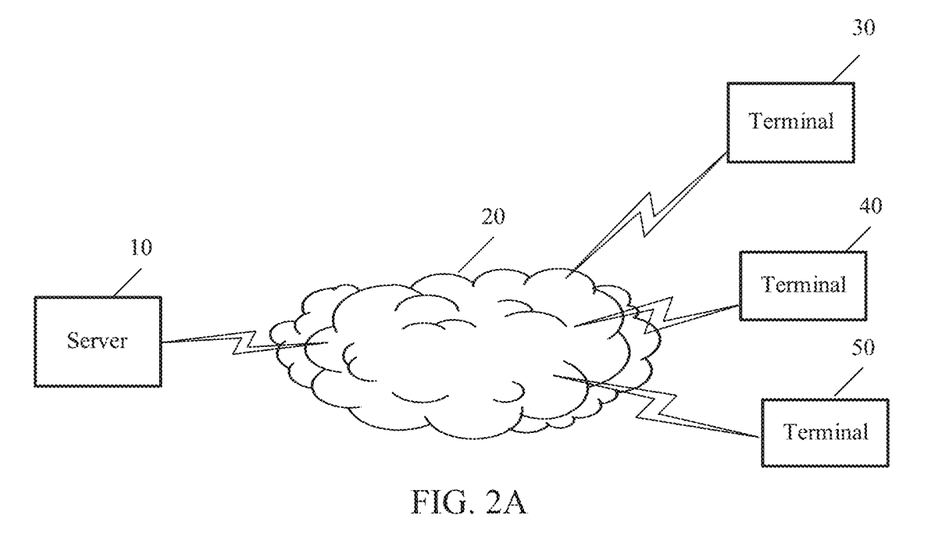
FIG. 2A is a schematic diagram of an application scenario of a method for data calculation in a neural network model according to an example embodiment of the disclosure.

FIG. 2A is a schematic diagram of an application scenario of a forward calculation method of a neural network model according to an example embodiment of the disclosure. In this application scenario, a server 10 communicates with terminal devices 30, 40, and 50 through a network 20. The method of each embodiment may be performed by a computing device. The computing device may be, for example, the server 10 shown in FIG. 2A, or the terminal devices 30, 40, and 50. The server 10 may be an independent physical server device, or may be a physical server in a server cluster. The terminal devices 30, 40, and 50 may be PCs, notebook computers, tablet computers, smart phones, smart TVs, game consoles, and the like.

Figure 2B:
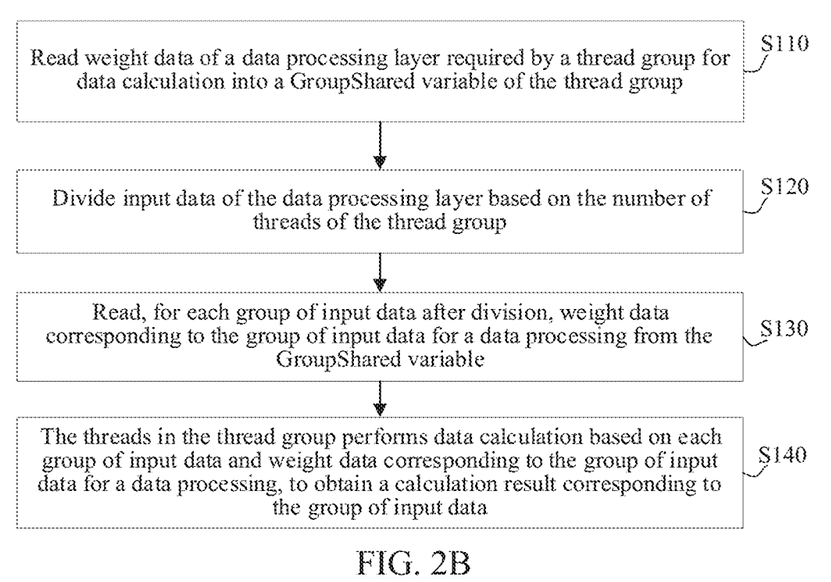
FIG. 2B is a schematic flowchart of a method for data calculation in a neural network model according to an example embodiment of the disclosure.

FIG. 2B is a schematic flowchart of a method for data calculation in a neural network model according to the disclosure. The method may be performed by a computing device, for example, the server 10 shown in FIG. 2A, or the terminal devices 30, 40, and 50. The method is applied to data calculation of at least one data processing layer in a neural network model, and the data calculation is performed by a thread group of a graphics processing unit (GPU). As shown in FIG. 2B, the method may include operation S110 to operation S140.

Operation S110: Read weight data of a data processing layer required by a thread group for data calculation into a GroupShared variable of the thread group.

The data processing layer is used for processing input data, and the neural network model may include at least one data processing layer. The data processing layer in the disclosure refers to a hidden layer of the neural network model, for example, including but not limited to a convolution layer, a zooming layer, and the like. It may be understood that, for different neural network model structures, the form of the data processing layer may vary.

Figure 3:
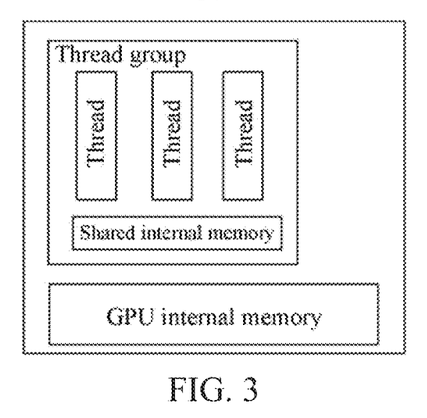
FIG. 3 is a schematic structural diagram of an internal memory in a GPU thread group according to an example embodiment of the disclosure.

The GPU usually includes an ordinary GPU internal memory and a shared internal memory accessible to a thread group. As shown in FIG. 3, in a thread group, a speed of accessing a shared internal memory is much faster than that of accessing an ordinary internal memory (a GPU internal memory shown in FIG. 3). In each embodiment, the weight data (weight data of the data processing layer required by the thread group for data calculation) that can be used by the threads in the thread group is stored in the shared internal memory, which can improve calculation efficiency. In an example embodiment of the disclosure, the shared internal memory in the GPU is usually implemented based on the GroupShared variable.

Operation S120: Divide the input data of the data processing layer based on the number of threads in the thread group.

A thread group may be represented by three dimensions. For example, if a thread group is 6*6*8, it indicates that the thread group includes 288 threads in total, and the thread group has a width of 6, a height of 6, and a depth of 8.

The thread group may be a group of thread groups or a plurality of thread groups, and the number of threads in each thread group may be the same or different. For each thread group, the input data may be divided in the same division manner or in a different division manner.

Operation S130: Read, for each group of input data after division, weight data corresponding to the group of input data for a data processing from the GroupShared variable.

After the input data is divided, the weight data required for the each group of input data for a data processing can be read from the weight data stored in the GroupShared variable. The weight data corresponding to the each group of input data for a data processing can be read from the weight data stored in the GroupShared variable. It may be understood that, during data processing on the input data of the data processing layer, in order to obtain a calculation result corresponding to the input data of the data processing layer, data processing may need to be performed at least once based on the thread group.

Operation S140: The threads in the thread group performs data calculation based on each group of input data and weight data corresponding to the group of input data for a data processing to obtain a calculation result corresponding to the group of input data.

After determining the each group of input data and the weight data corresponding to the group of input data, the threads in the thread group, that is, the thread corresponding to the each group of input data, may perform data calculation on the group of input data, to obtain the calculation result corresponding to the group of input data. Other groups of input field data may be calculated based on this manner to obtain corresponding calculation results.

In the method for data calculation in a neural network model according to an example embodiment of the disclosure, weight data of a data processing layer required by a thread group for data calculation can be read into a GroupShared variable of the thread group, and input data of the data processing layer can be divided based on the number of threads in the thread group. For threads in the same thread group, each thread needs the same weight data during a data processing. Therefore, for each group of input data after division, weight data corresponding to the group of input data for a data processing can be read from the GroupShared variable. Therefore, for input data corresponding to the same thread group, there is no need to read corresponding weight data once for each piece of input data, which can reduce the number of times of reading weight data. Therefore, when the threads in the thread group perform data calculation based on each group of input data and weight data corresponding to the group of input data for a data processing, to obtain a calculation result corresponding to the group of input data, calculation efficiency can be improved.

In an example embodiment of the disclosure, the method may further include:

storing calculation results corresponding to all the groups of input data into the GroupShared variable.

After the calculation result corresponding to the each group of input data is calculated, the calculation result corresponding to the each group of input data may also be stored into the GroupShared variable, so that a calculation result corresponding to the input data of the data processing layer can be obtained based on calculation results corresponding to all the groups of input data.

In an example embodiment of the disclosure, after obtaining the calculation results corresponding to the each group of input data, the method may further include:

obtaining output data of the same output position based on the calculation results corresponding to the same output position among the calculation results corresponding to all the groups of input data.

The input data includes input data of all positions, the corresponding calculation results obtained by calculating the input data may also include calculation results (output data) corresponding to all output positions, and the output data corresponding to the same position can be obtained based on the calculation results corresponding to the same output position among the calculation results corresponding to all the groups of input data.

In an example embodiment of the disclosure, the data processing layer includes a convolution layer, and the performing preset processing on calculation results corresponding to the same output position among the calculation results corresponding to all the groups of input data, to obtain output data of the same output position may include:

adding up the calculation results corresponding to the same output position among the calculation results corresponding to all the groups of input data, and adding a convolution bias of the convolution layer, to obtain the output data of the same output position.

For the convolution layer, the calculation manner of the output data of each output position is to add up the calculation results corresponding to the same output position among the calculation results corresponding to all the groups of input data, and add the convolution bias of the convolution layer. The convolution bias is also referred to as a convolution offset. Similarly, based on the foregoing manner, output data corresponding to all the output positions can be calculated.

In an example embodiment of the disclosure, in operation S120, the dividing input data of the data processing layer based on the number of threads in the thread group may include:

dividing the input data of the data processing layer based on the number of threads in a depth dimension of the thread group, where a data amount of the weight data corresponding to the each group of input data after division for a data processing is:

$Kw*Kh*C/Tz$, where

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

Specifically, if a thread group includes threads having three dimensions of Tx*Ty*Tz, the number of threads in the depth dimension is Tz. If the input data of the data processing layer has a width w, a height h, and a depth c, after the input data of the data processing layer is divided based on the number of threads in the depth dimension of the thread group, Tz groups of input data are obtained. Each thread in the thread group calculates calculation results corresponding to c/Tz convolutions, and the each thread needs to perform Tz calculations to obtain calculation results at the same output position on an output plane. Because each output plane (output channel) of the convolution requires the same weight data corresponding to the calculation results, and each output plane corresponds to the calculation results of all the groups of input data, the data amount of the weight data that needs to be obtained during a data processing is Kw*Kh*C/Tz for the each group of input data. If calculation results of Tx*Ty output positions on an output plane need to be calculated, the data amount of the weight data that needs to be read is: Kw*Kh*C. If there are M output channels, and M is an integer not less than 2, the data amount of the weight data that needs to be read is: Kw*Kh*C*M.

If the weight data is obtained in the manner in the related art, the weight data corresponding to each piece of input data is obtained once during calculating the calculation results of all input data based on the threads in the thread group, and the data amount of the weight data corresponding to the input data for a data processing is:

Tx*Ty*Tz*Kw*Kh*C/Tz

It can be seen that the solution of the disclosure can reduce the obtaining of weight data by Tx*Ty times compared with the solution in the related art.

As an example, assuming that the input data of the convolution layer has a width w of 16, a height h of 16, and a depth C of 20, that is, the size of the input data is 16*16*20, the number of output channels of the convolution layer is 40, and the size Kw*Kh of the convolution kernel is 3*3, the data amount of the weight data that needs to be obtained for this convolution layer is 3*3*20*40, and the data amount of the weight data required for calculating and outputting the calculation result of an output position is 3*3*20. That is, the data amount of weight data required by each thread group is Kw*Kh*C.

Based on the method of the disclosure, assuming that the thread group has a width Tx of 4, a height Ty of 4, and a depth Tz of 5, the calculation results of 4*4 output positions are calculated according to this thread group, and the input data of the data processing layer is divided according to the depth dimension of the thread group. Because the weight data required for the calculation results of all output planes (output channels) are the same, the data amount of weight data that needs to be read on this thread group is 3*3*20 for an output channel, and the data amount of weight data required for each group of input data after division for a data processing (convolution) is 3*3*20/5. Each thread needs to perform calculation for 5 times to obtain the calculation results of 4*4 output positions.

After the weight data is read, each thread group is divided according to the depth dimension Tz. The number of multiplications that a thread in the 4*4*5 group needs to calculate is (20/5)*3*3=36, which is equivalent to dividing the thread group according to the depth dimension, and finally performing addition on calculation results corresponding to all dimensions. That is, 5 threads calculate the calculation result of an output position, and 4*4*5 threads calculate and output the calculation results of 4*4 output positions on an output plane.

Figure 4:
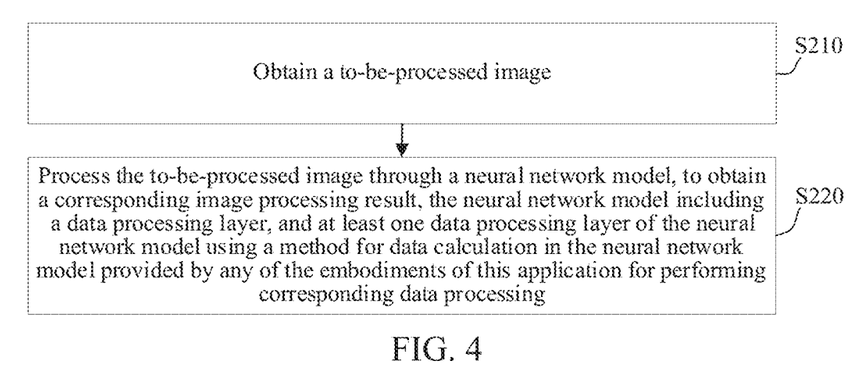
FIG. 4 is a schematic flowchart of an image processing method according to an example embodiment of the disclosure.

Based on the method for data calculation in a neural network model according to the foregoing embodiments of the disclosure, an embodiment of the disclosure further provides an image processing method. The method may be performed by a computing device, for example, the server 10 shown in FIG. 2A, or the terminal devices 30, 40, and 50. As shown in FIG. 4, the image processing method may include operation S210 and operation S220.

Operation S210: Obtain a target image to be processed (or referred to as a to-be-processed image).

Operation S220: Process the target image to be processed through a neural network model, to obtain a corresponding image processing result.

The neural network model includes a data processing layer, and at least one data processing layer of the neural network model uses the method for data calculation in a neural network model according to any of the foregoing embodiments of the disclosure to perform corresponding data processing.

In other words, the method for data calculation in a neural network model according to this embodiment of the disclosure may be specifically applied to the neural network model. One or more data processing layers in the neural network model may use the method for data calculation in a neural network model to upsample an image or a feature map. For example, the method for data calculation in a neural network model shown in FIG. 2 or another method for data calculation in a neural network models based on the method shown in FIG. 2 may be used for performing operation of a deconvolution layer.

In addition, it is clear to a person skilled in the art that, in actual application, for different image processing requirements, the neural network models may be different, and corresponding image processing results may also be different.

In some embodiments of the disclosure, the neural network model includes a target object recognition model, an image segmentation model, or an image classification model.

In the field of image processing, image features need to be extracted first based on a target image, and then further processing is performed based on the extracted features. During the feature extraction, an extracted feature map is usually smaller than the size of the targetimage. After further processing is completed based on the feature map, in order to obtain an image with the same size as the target image, the feature map or image after further processing needs to be upsampled. In the neural network model, the data processing layer (for example, the convolution layer) is usually used for implementation. Therefore, the method for data calculation in a neural network model according to this embodiment of the closure may be applied to various types of neural network models with a data processing layer, to improve image processing efficiency, and reduce resource consumption of an electronic device.

For example, a target object in the target image may be recognized through a target object recognition model. In the target object recognition model, the target image or the feature map extracted based on the target image may be upsampled through the data processing layer, to recognize the target object in the target image.

In another example, in order to segment the target object in the target image, for example, if the target object in the to target image is a human hand, a hand area of the person may be segmented from the target image through the image segmentation model. In the image segmentation model, the target image or the feature map extracted based on the target image may be upsampled through the data processing layer, to segment the target object in the target image.

In another example, in order to classify objects in the target image, the objects included in the target image may be classified through an image classification model. In the image classification model, the target image or the feature map extracted based on the target image may be upsampled through the data processing layer, to classify the objects in the target image.

In an example embodiment of the disclosure, when the target image or the feature map extracted based on the target image is upsampled through the data processing layer in the neural network model, the number of times of reading weight data can be reduced, thereby improving data processing efficiency.

Figure 5A:
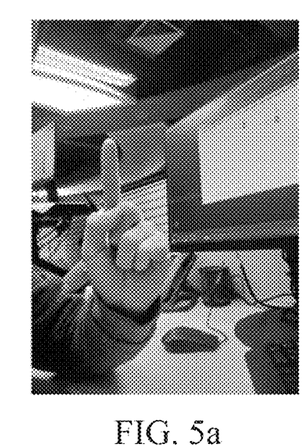
FIG. 5a and FIG. 5b are schematic diagrams of segmenting a hand area based on a neural network model according to an example embodiment of the disclosure.
Figure 5B:
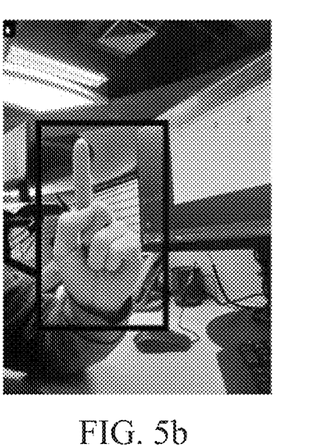

A hand area recognition application scenario is shown in FIG. 5a and FIG. 5b as an example. The target object in the target image is a hand area of a human, the hand area in FIG. 5a is automatically segmented by using the image segmentation model of the disclosure, and the segmented hand area is marked, to obtain a segmentation result shown in FIG. 5b (the area marked by a thick frame shown in FIG. 5b). In the image segmentation model, the target image or the feature map extracted based on the target image may be upsampled through the data processing layer, to segment the hand area in the target image. In an example embodiment of the disclosure, when the target image or the feature map extracted based on the target image is upsampled through the data processing layer, the number of times of reading weight data can be reduced, thereby improving data processing efficiency.

Figure 5C:
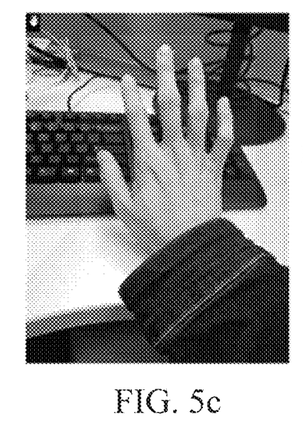
FIG. 5c and FIG. 5d are schematic diagrams of recognizing a hand area based on a neural network model according to an example embodiment of the disclosure.
Figure 5D:
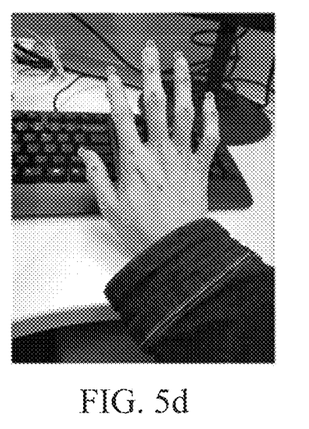

A hand area recognition application scenario is shown in FIG. 5c and FIG. 5d as another example. The target object in the target image is a hand area of a human, and joint points of the hand in a gesture area in FIG. 5c may be recognized and marked by using the target object recognition model of this application. A gesture skeleton (the area marked by dots shown in FIG. 5d) shown in FIG. 5d is formed based on the marked joint points, and the gesture skeleton is the recognized target object. In the target object recognition model, the targetimage or the feature map extracted based on the target image may be upsampled through the data processing layer, to recognize the hand area from the target image. In an example embodiment of the disclosure, when the target image or the feature map extracted based on the target image is upsampled through the data processing layer, the number of times of reading weight data can be reduced, thereby improving data processing efficiency.

Figure 5E:
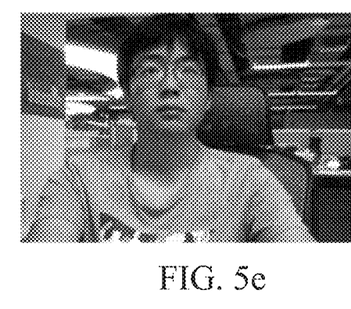
FIG. 5e and FIG. 5f are schematic diagrams of recognizing a face area based on a neural network model according to an example embodiment of the disclosure.
Figure 5F:
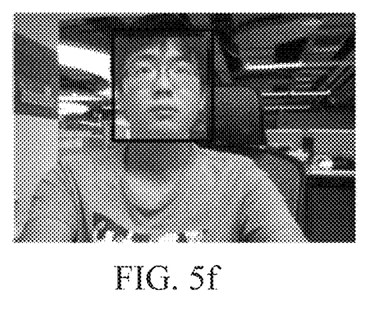

A face detection application scenario is shown in FIG. 5e and FIG. 5f as another example. The target object in the target image is a human face, the area where the face in FIG. 5e is located may be recognized, and the recognized face area may be marked as shown in FIG. 5f (the area marked by a thick frame shown in FIG. 5f) by using the target object recognition model of the disclosure. In the target object recognition model, target image or the feature map extracted based on the target image may be upsampled through the data processing layer, to recognize the face area from the target image. In the solution of this application, when the target image or the feature map extracted based on the target image is upsampled through the data processing layer, the number of times of reading weight data can be reduced, thereby improving data processing efficiency.

In this way, when data processing is performed on data of the hand area or the face area based on the recognition of the hand area and the recognition of the face area performed by the data processing layer of this application, calculation efficiency can be improved based on the example embodiment of the disclosure.

Figure 6:
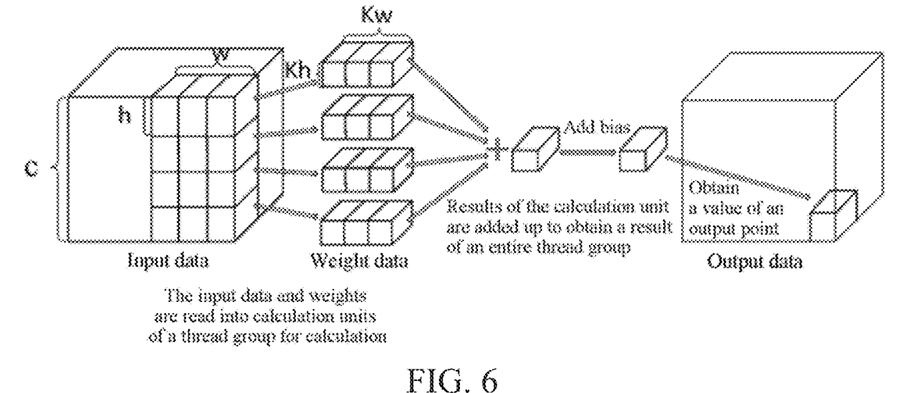
FIG. 6 is a schematic diagram of a calculation process of calculating output data based on a GPU according to an example embodiment of the disclosure.

The example embodiment of the disclosure is further described below with reference to FIG. 6. FIG. 6 shows a solution of dividing the input data of the data processing layer based on the number of threads in the depth dimension of the thread group, and obtaining output data corresponding to the same output position through calculation based on each group of input data after division.

As shown in FIG. 6, the input data has a width w, a height h, and a depth c, and the number of threads in a thread group is Tx*Ty*Tz, Tx being a width dimension in the thread group, Ty being a height dimension in the thread group, and Tz being a depth dimension in the thread group. The data processing layer is a convolution layer, the number of output channels of the convolution layer is 1, and the number of input channels of the convolution layer is C.

1) Read weight data (weight data shown in FIG. 6) required by the thread group into a GroupShared variable.

2) Divide input data of the data processing layer based on the number of threads in the depth dimension of the thread group, to obtain Tz groups of input data. As shown in FIG. 6, Tz is 4, each group of input data has a width of 3, and a height of 1, and each thread calculates calculation results corresponding to C/Tz convolutions. Each thread needs to perform Tz calculations to obtain calculation results of the same output position on an output channel. During calculation, each thread may read weight data corresponding to each group of input data for a data processing from the GroupShared variable, and store a calculation result corresponding to the each group of input data for a data processing into the GroupShared variable. The same weight data is required for the calculation results corresponding to an output channel. Therefore, for each group of input data, the data amount of the weight data that needs to be obtained during a data processing is Kw*Kh*C/Tz.

3) The threads in the thread group performs data calculation based on each group of input data and weight data corresponding to the group of input data, to obtain a calculation result corresponding to the group of input data. The input data and weights shown in FIG. 6 are read into calculation units (threads) of a thread group for calculation.

Specifically, the calculation results corresponding to the same output position (the same x and y coordinate) among the calculation results corresponding to all the groups of input data (the results (calculation results) corresponding to the calculation units shown in FIG. 6 are added up to obtain the result of the entire thread group), and a convolution bias of the convolution layer may be added, to obtain the output data of the same output position, that is, the calculation results of the same output position (to obtain the value of an output point as shown in FIG. 6).

Based on the foregoing manner, a data amount of the weight data corresponding to the each group of input data after division for a data processing is:

Kw*Kh*C/Tz, where

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

If the weight data is obtained by the manner in the related art, during calculating the calculation results of all input data based on the threads in the thread group, each piece of input data correspondingly obtains the weight data once, and the data amount of the weight data corresponding to each group of input data for a data processing is:

$$Tx*Ty*Tz*Kw*Kh*C/Tz$$

It can be seen that an example embodiment of the disclosure can reduce the obtaining of weight data by Tx*Ty times compared with the solution in the related art.

It may be understood that, the input data of the data processing layer may also be divided based on the number of threads in the width dimension or the height dimension of the thread group, which can also reduce the number of times of reading weight data.

The method of the disclosure may be applied to an application scenario of image processing, such as image segmentation or target recognition. The method of the disclosure may also be applied to scenarios in which a shader performs calculation, including interfaces on which a shader may be used for calculation, such as OpenGL, Direct3D, and Metal, all of which can use this algorithm for accelerating calculation.

Based on an example embodiment of the disclosure, compared with the calculation result of an output position calculated by a GPU thread, the example embodiment of the disclosure can improve the efficiency by 30% to 40% under some hardware conditions. As shown in Table 1, during running a neural network model (portrait segmentation model), the method in the related art is used for calculation, and an embodiment of the disclosure is used for calculating the calculation time on different graphics cards:

TABLE 1

| Graphics card type | Running time (ms) using the related art | Running time (ms) using the method of this application | Performance improvement percentage (%) |
|---|---|---|---|
| Intel HD530 | 32 ms | 18 ms | 43.8% |
| Intel HD630 | 25 ms | 15 ms | 40% |
| Nvidia 1050Ti | 11 ms | 8 ms | 27% |

From the data in Table 1, it can be seen that, based on the graphics card with the graphics card type of Intel HD530, a time consumed for performing data calculation on the input data by using the method of this application is 18 ms, and a time consumed for performing data calculation on the input data by using the solution in the related art is 32 ms. Therefore, the time consumed for performing data calculation on the input data based on the example embodiment of the disclosure is significantly shorter than that for performing data calculation on the input data based on the method in the related art, and performance is improved by 43.8%. Based on the graphics card with the graphics card type of Intel HD630, a time consumed for performing data calculation on the input data by using the method of the disclosure is 15 ms, and a time consumed for performing data calculation on the input data by using the solution in the related art is 25 ms. Therefore, the time consumed for performing data calculation on the input data based on the example embodiment of the disclosure is also significantly shorter than that for performing data calculation on the input data based on the method in the related art, and performance is improved by 40%. Based on the graphics card with the graphics card type of Nvidia 1050Ti, a time consumed for performing data calculation on the input data by using the method of the disclosure is 8 ms, and a time consumed for performing data calculation on the input data by using the solution in the related art for performing data calculation on the input data is 11 ms. Therefore, the time consumed for performing data calculation on the input data based on the embodiment of the disclosure is also significantly shorter than that for performing data calculation on the input data based on the method in the related art, and performance is improved by 27%.

Figure 7:
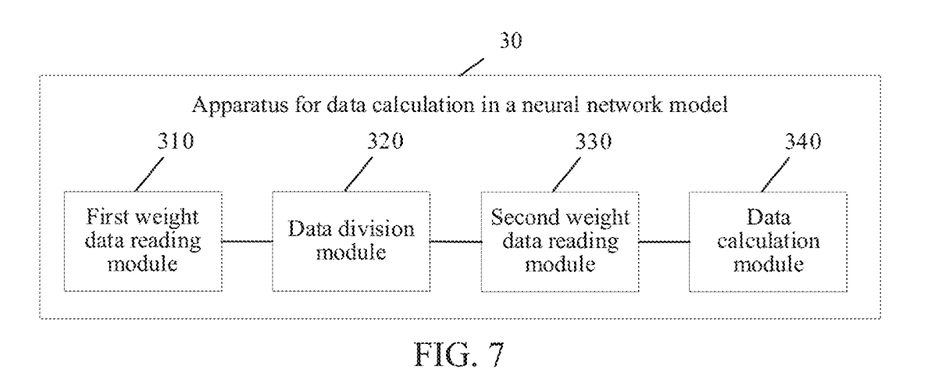
FIG. 7 is a schematic structural diagram of an apparatus for data calculation in a neural network model according to an example embodiment of the disclosure.

Based on the same principle as the method shown in FIG. 2, an embodiment of the disclosure further provides an apparatus 30 for data calculation in a neural network model. The apparatus is applied to data calculation of at least one data processing layer in a neural network model, and the data calculation is performed by a thread group of a graphics processing unit (GPU). As shown in FIG. 7, the apparatus 30 for data calculation in a neural network model may include a first weight data reading module 310, a data division module 320, a second weight data reading module 330, and a data calculation module 340.

The first weight data reading module 310 is configured to read weight data of a data processing layer required by a thread group for data calculation into a GroupShared variable of the thread group.

The data division module 320 is configured to divide input data of the data processing layer based on the number of threads in the thread group.

The second weight data reading module 330 is configured to read, for each group of the input data after division, weight data corresponding to the group of the input data for a data processing from the GroupShared variables.

The data calculation module 340 is configured to enable the threads in the thread group to data calculation based on each group of input data and weight data corresponding to the group of input data for a data processing, to obtain a calculation result corresponding to the group of input data.

The apparatus for data calculation in a neural network model according to this embodiment of the disclosure can read weight data of a data processing layer required by a thread group for data calculation into a GroupShared variable of the thread group, and divide input data of the data processing layer based on the number of threads in the thread group. For threads in the same thread group, each thread needs the same weight data during a data processing. Therefore, for each group of input data after division, weight data corresponding to the group of input data for a data processing can be read from the GroupShared variable. Therefore, for input data corresponding to the same thread group, there is no need to read corresponding weight data once for each piece of input data, which can reduce the number of times of reading weight data. Therefore, when the threads in the thread group perform data calculation based on each group of input data and weight data corresponding to the group of input data for a data processing, to obtain a calculation result corresponding to the group of input data, calculation efficiency can be improved.

In some embodiments, the apparatus further includes:
a storage module, configured to store calculation results corresponding to all the groups of input data into the GroupShared variable.

In some embodiments, the apparatus further includes:
an output data determining module, configured to: after the calculation results corresponding to all the groups of input data are obtained, obtain output data of the same output position based on the calculation results corresponding to the same output position among the calculation results corresponding to all the groups of input data.

In some embodiments, the data processing layer includes a convolution layer. That the output data determining module obtains the output data of the same output position based on the calculation results corresponding to the same output position among the calculation results corresponding to all the groups of input data is further configured to:

add up the calculation results corresponding to the same output position among the calculation results corresponding to all the groups of input data, and add a convolution bias of the convolution layer, to obtain the output data of the same output position.

In some embodiments, that the data division module divides the input data of the data processing layer based on the number of threads in the thread group is further configured to:

divide the input data of the data processing layer based on the number of threads in a depth dimension of the thread group, where
a data amount of the weight data corresponding to the each group of input data after division for a data processing is:

$Kw*Kh*C/Tz$, where

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

Because the apparatus for data calculation in a neural network model according to this embodiment of the disclosure is an apparatus that can perform the method for data calculation in a neural network model in the embodiments of the disclosure, a person skilled in the art may understand specific implementations of the apparatus for data calculation in a neural network model of this embodiment of the disclosure and various variations thereof based on the method for data calculation in a neural network model according to the embodiments of the disclosure. Therefore, how the apparatus implements the method for data calculation in a neural network model in the embodiments of the disclosure is not to be described in detail herein. All apparatuses for data calculation in a neural network model used when a person skilled in the art implements the method for data calculation in a neural network model in the embodiments of the disclosure shall fall within the protection scope of the disclosure.

Based on the same principle of the method for data calculation in a neural network model and the apparatus for data calculation in a neural network model provided in the embodiments of the disclosure, an example embodiment of the disclosure further provides an electronic device. The electronic device may include a processor and a memory. The memory stores readable instructions. The readable instructions, when loaded and executed by the processor, may implement the method shown in any embodiment of the disclosure.

Figure 8:
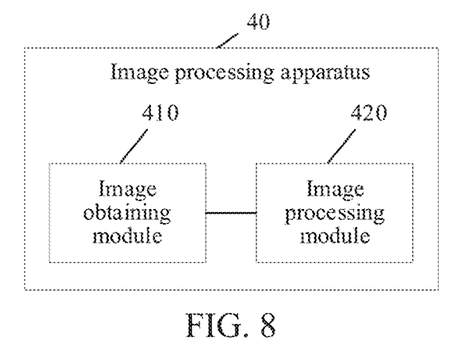
FIG. 8 is a schematic structural diagram of an image processing apparatus according to an example embodiment of the disclosure.

Based on the same principle of the method shown in FIG. 4, an example embodiment of the disclosure further provides an image processing apparatus 40. As shown in FIG. 8, the image processing apparatus 40 may include an image obtaining module 410 and an image processing module 420.

The image obtaining module 410 is configured to obtain a target image.

The image processing module 420 is configured to process the target image through a neural network model, to obtain a corresponding image processing result.

The neural network model includes a data processing layer, and at least one data processing layer of the neural network model using the method for data calculation in a neural network model provided in any of the embodiments of the disclosure to perform corresponding data processing.

In an example embodiment, the neural network model includes a target object recognition model, an image segmentation model, or an image classification model.

Figure 9:
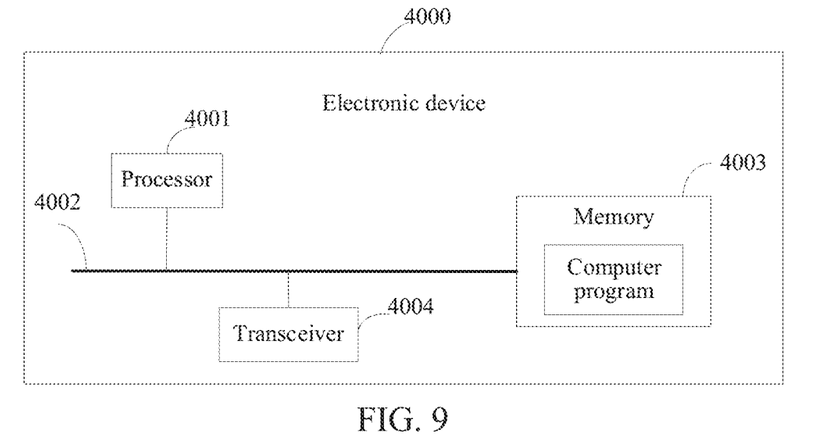
FIG. 9 is a schematic structural diagram of an electronic device according to an example embodiment of the disclosure.

In an example embodiment, an electronic device is provided. As shown in FIG. 9, an electronic device 4000 shown in FIG. 9 includes: a processor 4001 and a memory 4003. The processor 4001 and the memory 4003 are connected, for example, are connected by a bus 4002. In some embodiments, the electronic device 4000 may further include a transceiver 4004. In an actual application, there may be one or more transceivers 4004. The structure of the electronic device 4000 does not constitute a limitation on this embodiment of the disclosure.

The processor 4001 may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in the disclosure. The processor 4001 may be alternatively a combination to implement a computing function, for example, may be a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 9 is represented by using only one bold line, but this does not indicate that there is only one bus or one type of bus.

The memory 4003 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that can be used to carry or store expected program code in a command or data structure form and that can be accessed by a computer, but is not limited thereto.

The memory 4003 is configured to store application program code for performing the solutions of the disclosure, and the application program code is executed under control of the processor 4001. The processor 4001 is configured to execute the application program code stored in the memory 4003 to implement the content shown in any one of the foregoing method embodiments.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of the disclosure. A person of ordinary skill in the art may make several improvements and refinements without departing from the principle of this application, and the improvements and refinements shall fall within the protection scope of the disclosure.

What is claimed is:

1. A method for data calculation in a neural network model, performed by a computing device, the method comprising:
    reading weight data associated with a data processing layer in a neural network model into a GroupShared variable of a thread group of a graphics processing unit (GPU)
    dividing input data of the data processing layer into a plurality of groups of input data based on the number of threads in a depth dimension of the thread group;
    reading, for each group of input data, respective group weight data corresponding to each group of input data from the GroupShared variable; and
    performing, by each thread in the thread group, the data processing by using a group of read input data and respective weight data corresponding to the group of input data, to obtain a calculation result corresponding to the group of input data, wherein
    a data amount of the weight data corresponding to each group of input data after division for data processing is:

Kw*Kh*C/Tz, wherein

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

2. The method according to claim 1, further comprising:
    storing calculation results corresponding to all groups of input data into the GroupShared variable.

3. The method according to claim 1, further comprising:
    performing preset processing on calculation results corresponding to the same output position among the calculation results corresponding to all the groups of input data, to obtain output data of the same output position.

4. The method according to claim 3, wherein the data processing layer comprises a convolution layer, and the performing preset processing on calculation results corresponding to the same output position among the calculation results corresponding to all the groups of input data, to obtain output data of the same output position comprises:
    adding up the calculation results corresponding to the same output position among the calculation results corresponding to all the groups of input data, and adding a convolution bias of the convolution layer, to obtain the output data of the same output position.

5. The method according to claim 1, further comprising:
    obtaining a target image; and
    processing the target image through the neural network model, to obtain a corresponding image processing result.

6. The method according to claim 5, wherein the neural network model comprises a target object recognition model, an image segmentation model, or an image classification model.

7. An apparatus for data calculation in a neural network model, comprising
    at least one memory configured to store program code; and
    at least one processor configured to read the program code and operate as instructed by the program code, the program code comprising:
    first weight data reading code configured to cause the at least one processor to read weight data associated with a data processing layer in a neural network model into a GroupShared variable of a thread group of a graphics processing unit (GPU)
    data division code configured to cause the at least one processor to divide input data of the data processing layer into a plurality of groups of input data based on the number of threads in a depth dimension of the thread group:
    second weight data reading code configured to cause the at least one processor to read, for each group of input data, respective group weight data corresponding to each group of input data from the GroupShared variable; and
    data calculation code configured to cause the at least one processor to enable each thread in the thread group to perform data processing by using a group of input data read by the second weight data reading code and respective weight data corresponding to the group of input data, to obtain a calculation result corresponding to the group of input data, wherein
    a data amount of the weight data corresponding to each group of input data after division for data processing is:

Kw"Kh*C/Tz, wherein

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

8. The apparatus for data calculation according to claim 7, further comprising:
    storage code configured to cause the at least one processor to store calculation results corresponding to all the groups of input data into the GroupShared variable.

9. The apparatus for data calculation according to claim 7, further comprising:
    output data determining code configured to cause the at least one processor to perform preset processing on calculation results corresponding to the same output position among the calculation results corresponding to all the groups of input data, to obtain output data of the same output position.

10. The apparatus for data calculation according to claim 9, wherein the data processing layer comprises a convolution layer, and
    the output data determining code is further configured to cause the at least one processor to add up the calculation results corresponding to the same output position among the calculation results corresponding to all the groups of input data, and add a convolution bias of the convolution layer, to obtain the output data of the same output position.

11. The apparatus according to claim 7, further comprising
image obtaining code configured to cause the at least one processor to obtain a target image; and
image processing code configured to cause the at least one processor to process the target image through the neural network model, to obtain a corresponding image processing result.

12. The apparatus according to claim 11, wherein the neural network model comprises a target object recognition model, an image segmentation model, or an image classification model.

13. A non-transitory computer-readable storage medium, storing a computer program that when executed by at least one processor causes the at least one processor to:
read weight data associated with a data processing layer in a neural network model into a GroupShared variable of a thread group of a graphics processing unit (GPU);
divide input data of the data processing layer into a plurality of groups of input data based on the number of threads in a depth dimension of the thread group;
read, for each group of input data, respective group weight data corresponding to each group of input data from the GroupShared variable; and
perform, by each thread in the thread group, the data processing by using a group of read input data and respective weight data corresponding to the group of input data, to obtain a calculation result corresponding to the group of input data, wherein
a data amount of the weight data corresponding to each group of input data after division for data processing is:

$Kw*Kh*C/Tz$, wherein

Tz is the number of threads in the depth dimension of the thread group, Kw is a width of a convolution kernel, Kh is a height of the convolution kernel, C is the number of input channels of the convolution layer, and C/Tz represents the number of input channels of convolution processed by each thread during a data processing.

14. The non-transitory computer-readable storage medium according to claim 13, further configured to cause the at least one processor to:
store calculation results corresponding to all groups of input data into the GroupShared variable.

15. The non-transitory computer-readable storage medium according to claim 13, further configured to cause the at least one processor to:
perform preset processing on calculation results corresponding to the same output position among the calculation results corresponding to all the groups of input data, to obtain output data of the same output position.

16. The non-transitory computer-readable storage medium according to claim 15, wherein the data processing layer comprises a convolution layer, and the performing preset processing on calculation results corresponding to the same output position among the calculation results corresponding to all the groups of input data, to obtain output data of the same output position comprises:
adding up the calculation results corresponding to the same output position among the calculation results corresponding to all the groups of input data, and adding a convolution bias of the convolution layer, to obtain the output data of the same output position.

17. The non-transitory computer-readable storage medium according to claim 13, further configured to cause the at least one processor to:
obtain a target image; and
process the target image through the neural network model, to obtain a corresponding image processing result.

* * * * *